(12) United States Patent
Wenzel et al.

(10) Patent No.: US 9,619,947 B2
(45) Date of Patent: Apr. 11, 2017

(54) METHOD AND MEANS FOR OPERATING A FIRST MOTOR VEHICLE ON THE BASIS OF AT LEAST ONE CHARACTERISTIC OF AT LEAST ONE SECOND MOTOR VEHICLE

(71) Applicant: Robert Bosch GmbH, Stuttgart (DE)

(72) Inventors: Sebastian-Paul Wenzel, Eisenach (DE); Stefan Motz, Bari Santo Spirito (IT)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/767,079

(22) PCT Filed: Jan. 14, 2014

(86) PCT No.: PCT/EP2014/050535
§ 371 (c)(1),
(2) Date: Aug. 11, 2015

(87) PCT Pub. No.: WO2014/121981
PCT Pub. Date: Aug. 14, 2014

(65) Prior Publication Data
US 2015/0371460 A1 Dec. 24, 2015

(30) Foreign Application Priority Data
Feb. 11, 2013 (DE) .................. 10 2013 202 193

(51) Int. Cl.
*G07C 5/08* (2006.01)
*G07C 5/00* (2006.01)
*B60K 15/03* (2006.01)

(52) U.S. Cl.
CPC ............... *G07C 5/08* (2013.01); *G07C 5/008* (2013.01); *B60K 2015/03197* (2013.01);
(Continued)

(58) Field of Classification Search
CPC G07C 5/08; G07C 5/008; B60K 2015/03197; B60K 2015/03361; F02D 2200/0612; F02D 2200/701; F02D 2200/70
(Continued)

(56) References Cited

U.S. PATENT DOCUMENTS 5,442,553 A 8/1995 Parrillo
7,689,230 B2 3/2010 Spadafora et al.
(Continued)

FOREIGN PATENT DOCUMENTS

| CN | 101772789 A | 7/2010 |
|---|---|---|
| CN | 102213962 A | 10/2011 |
| DE | 102009047324 A1 | 6/2011 |

OTHER PUBLICATIONS

International Search Report for PCT/EP2014/050535, issued on Apr. 22, 2014.
(Continued)

*Primary Examiner* — Anne M Antonucci
(74) *Attorney, Agent, or Firm* — Gerard Messina

(57) ABSTRACT

A method is provided for operating a first motor vehicle, at least one characteristic relevant to the operation of the first motor vehicle being ascertained and at least one component of the first motor vehicle being actuated on the basis of the at least one characteristic. The at least one characteristic is ascertained in at least one second motor vehicle. An arrangement for implementing such a method is also provided.

11 Claims, 2 Drawing Sheets

(52) U.S. Cl.
CPC ............... *B60K 2015/03361* (2013.01); *F02D 2200/0612* (2013.01); *F02D 2200/70* (2013.01); *F02D 2200/701* (2013.01)

(58) Field of Classification Search
USPC .......................................................... 701/1
See application file for complete search history.

(56) References Cited

U.S. PATENT DOCUMENTS

| 8,929,198 B2 | 1/2015 | Yousefi et al. |
| 2008/0125933 A1* | 5/2008 | Williams ............... G06Q 10/08 701/29.5 |
| 2009/0134981 A1* | 5/2009 | Shafaat ................ G08G 5/0008 340/313 |
| 2012/0078487 A1 | 3/2012 | Light-Holets |

OTHER PUBLICATIONS

Vossoughi, G.R. et al., "Optimization of the Calibration for an Internal Combustion Engine Management System Using Multi-Objective Genetic Algorithms," Evolutionary Computation, IEEE Congress on Edinburgh, Scotland, U.K., pp. 1254-1261, Sep. 2005 (Sep. 2, 2005).

\* cited by examiner

METHOD AND MEANS FOR OPERATING A FIRST MOTOR VEHICLE ON THE BASIS OF AT LEAST ONE CHARACTERISTIC OF AT LEAST ONE SECOND MOTOR VEHICLE

FIELD OF THE INVENTION

The present invention relates to a method for operating a first motor vehicle on the basis of characteristics relevant to the operation of the first motor vehicle, as well as a means for implementing such a method.

BACKGROUND INFORMATION

Modern motor vehicles have a series of sensors. They supply sensor values which are used in the operation of the motor vehicle, in the engine control unit, for example. The term "characteristics" is used, within the scope of this Application, for appropriate sensor values and/or values derived from these. A corresponding operation advantageously takes place over the entire service life of the motor vehicles. Because of this, environmental conditions or environmental influences may be compensated for, and the steadily rising requirements on emissions, noise, driveability and comfort and convenience may be fulfilled.

Sensors installed in modern motor vehicles include, for example, a lambda sensor, an air mass sensor, as well as an intake-air pressure sensor or an intake-air temperature sensor. If a motor vehicle also has a combustion chamber pressure sensor, it possesses nearly the same equipment, and therefore the same diagnostic possibilities as a motor vehicle in the laboratory during the development phase. Future motor vehicles will have additional sensors, for instance, exhaust gas particle and nitrogen oxide sensors.

However, the multitude of sensors installed in motor vehicles cause considerable costs and may even lead to an increased susceptibility to maintenance. Therefore, there is a requirement for possibilities of reducing the expenditure for providing corresponding characteristics.

SUMMARY

With this as background, the present invention provides a method for operating a first motor vehicle on the basis of relevant characteristics for the operation of a first motor vehicle and means for implementing such a method, having the features of the independent claims.

Advantageous refinements are the subject matter of the dependent claims and of the following description.

An essential concept of the present invention is not to equip all motor vehicles, of a type or a comparable type, with all the sensors named, but only a certain percentage of the motor vehicle fleet, such as 30%. Motor vehicles which possess a complete set of sensors are designated as "fully equipped", within the scope of this Application, and those having a correspondingly reduced set of sensors as "mot fully equipped" motor vehicles. The present invention is not limited to passenger cars, but may also be used in motorcycles and trucks, for example. An information exchange between the fully equipped and the not fully equipped motor vehicles ensures an equal state of information for all motor vehicles. This makes it possible to ascertain relevant characteristics in the fully equipped motor vehicles for the operation of the not fully equipped motor vehicles, and to transmit these characteristics to the not fully equipped motor vehicles.

within the scope of the present invention, the transmission of the data takes place with particular advantage within the scope of "connected cars" and "Web 3.0 solutions". Vehicles which are connected to one another as "connected cars" have vehicle communication systems via which they are enabled to communicate with one another and to exchange information. The concept of "connected cars" has already been partially implemented in conventional vehicles. For instance, there are navigation systems which register traffic jams and pass on data on these to other navigation systems in other vehicles. The concept of "Web 3.0", a platform for exchanging data and draw conclusions from these data, is explained with reference to the attached drawings. An information exchange via an appropriate diagnostic or service unit may be preferred to a simple communication via "connected cars", since more possibilities for data validation are yielded in this manner.

The concept "characteristics relevant to the operation", within the scope of this Application, designates, as explained, all the values which are ascertained in conventional motor vehicles using sensors, or are derived from corresponding sensor values. For example, this may be about sensor values of combustion chamber pressure sensors, lambda probes, fuel pressure sensors, fuel quality sensors, air mass sensors, intake-air temperature sensors, intake-air pressure sensors, nitrogen oxide sensors and/or particle sensors and/or variables derived from these. The characteristics do not have to be limited to the sensor values named, but may also include characteristics of a system behavior, for instance, values of a controller intervention of a control process.

However, the present invention is also not limited to the specifically named sensor values, but may be used with all variables which have an influence on the operation of the motor vehicle in any way. This is, in particular, about values whose magnitudes behave and develop during the service life of motor vehicles of the same type and/or of comparable types and/or of corresponding motor vehicle components of the same type and/or of comparable types in an at least partially reproducible manner. Thereby, a simple adaptation may also take place to an aging state or a wear state of a corresponding motor vehicle and/or of corresponding components. In the case of reproducibly behaving values, furthermore environmental conditions may be taken into account by simple methods of change or adaptation.

While using fully equipped motor vehicles which have all the sensors named, it is also possible, for instance, to act on aging effects which influence the injection system or the combustion system, or on corresponding drift effects (such as of the air mass sensor and/or injectors). This applies, in particular, when the motor vehicles are equipped with combustion chamber pressure sensors, since, in that case, particularly precise data are available on the combustion in the individual cylinders. As was explained, it is moreover possible to act on the aging or drift effects and/or on environmental conditions, by corresponding methods of change or adaptation. This may be done particularly within the scope of a control process having closed-loop control.

One important aspect of the present invention is also the providing of service or diagnostic stations, to which the characteristics of the fully equipped motor vehicles are transmitted, and from which they may be recalled by the motor vehicles that are not fully equipped. The corresponding diagnostic stations are advantageously connected to the fully equipped and the not fully equipped motor vehicles by respectively one or more radio links, which may optionally be developed in a unidirectional or bidirectional manner. For the development of the radio links, terrestrial mobile radio and/or satellite radio may be used. A combination of the methods mentioned may also be used.

A further improvement comes about if the application of the control units of the next engine generation is carried out on the basis of characteristics which are ascertained in the fully equipped motor vehicles. The fully equipped motor vehicles supply a large number of characteristics ascertained under real conditions in the field, and thus form the real course of operation in a reproducible manner. This makes possible a significant reduction in the time and costs of development. The fully equipped motor vehicles represent, so to speak, laboratory specimens and text specimens for the motor vehicle development of the next generation of the same or of another model series.

The diagnostic stations explained before may also be set up statistically to evaluate and process further the data received from the fully equipped motor vehicles, such as sensor data and/or characteristics derived from them. For the further processing, simulation models of the motor vehicles, of the respective engine and/or the entire drive train may be used. The measured data, that originate with the fully equipped motor vehicles, therefore form a part of the input data for the simulation models.

If a deterioration or a deviation of the system in comparison to the initial state is determined in this context, it is possible to provide correction signals for the engine application in the not fully equipped motor vehicles, because these should show a similar deviation, seen from a statistical point of view. In order to ensure that the motor vehicles, that are not fully equipped, do indeed show a corresponding deviation, they may also be set up to send their measured data (which were ascertained using a correspondingly lesser number of sensors) to the diagnostic station. Corresponding data of a reduced set of sensors may possibly describe an aging state, although they possibly cannot supply any complete picture of the motor vehicle state.

The statistical evaluation, as explained, may further be used to adapt or optimize the engine application of a next generation of motor vehicles, because thereby a large number of system drifts, which could occur during the life of the individual motor vehicles, may be taken into account in advance.

With particular advantage, position signals, such as satellite position signals (GPS), but also mobile radio location system data may be used to communicate locally present conditions, for instance a fuel quality at different gas stations. When a motor vehicle, that is equipped with a suitable fuel quality sensor or combustion chamber pressure sensor, fills up at a certain gas station, whose location may be established via a corresponding location signal, it is then able to communicate the data with respect to the fuel quality at this gas station to the other motor vehicles. Consequently, the other motor vehicles, which have filled up at that gas station, but are not equipped with the corresponding sensors, may be operated on the basis of the fuel quality ascertained.

A processing unit according to the present invention, such as the diagnostic station explained, is set up as means for implementing the method, particularly as to program technology, and to carry out the method according to the present invention.

The implementation of the method in the form of software is also advantageous, since this incurs particularly low costs, especially if an executing control unit is also used for other tasks and is therefore present anyway. Suitable data carriers for providing the computer program are, in particular, diskettes, hard disks, flash memories, EEPROMs, CD-ROMs, DVDs, etc. A download of a program via computer networks (Internet, intranet, etc.) is also possible.

Further advantages and developments of the present invention derive from the description and the enclosed drawings.

It is understood that the features mentioned above and the features yet to be explained below may be used not only in the combination indicated in each case but also in other combinations or in isolation, without departing from the scope of the present invention.

The present invention is represented schematically in the drawings in the light of an exemplary embodiment, and is described in detail below with reference to the drawings.

DETAILED DESCRIPTION

Figure 1:
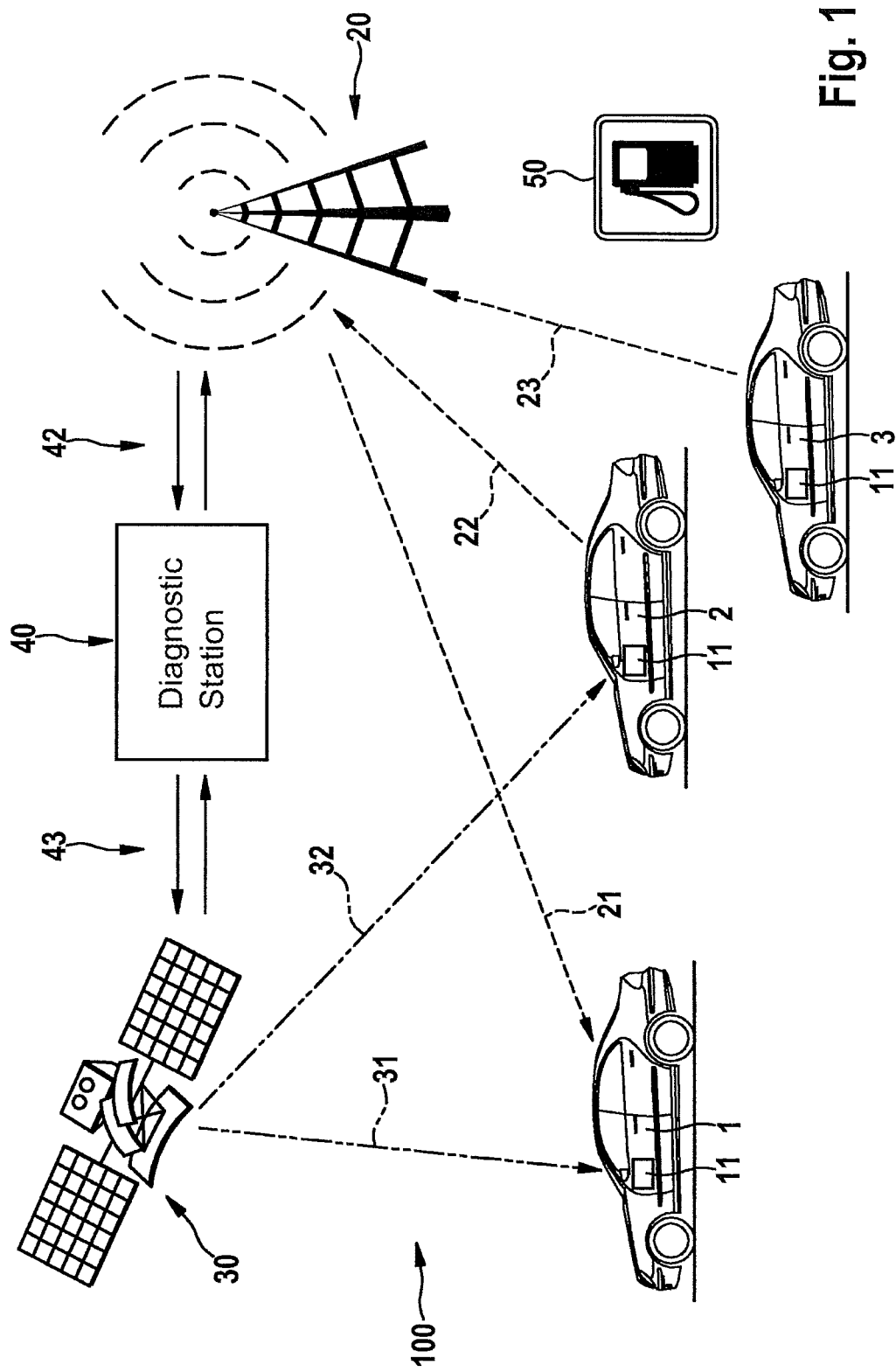
FIG. 1 shows a system with the aid of which a method according to a particularly preferred specific embodiment of the invention is illustrated.

FIG. 1 shows a system with the aid of which a method according to a particularly preferred specific embodiment of the invention is illustrated. The system is denoted overall by 100. System 100 includes a first motor vehicle 1. Two additional motor vehicles 2 and 3, denoted within the scope of the Application as "second motor vehicles", are also shown. Let it be understood that the present invention is not limited to the use of the three motor vehicles 1, 2, 3 shown, but may be used with a plurality of motor vehicles, such as motor vehicles of the same design (that is, of a motor vehicle fleet).

Motor vehicles 1, 2, 3 each have components 11, which may be actuated using at least one characteristic. Components 11 may be the engine, for instance, an injection system and/or an exhaust gas system. Components 11 are each actuated while using characteristics which are obtained in conventional motor vehicles by sensors, which are present in motor vehicle 1, 2, 3 itself Within the scope of the present invention, however, this is not necessarily the case. In the example shown, only motor vehicles 2 and 3 are fully equipped motor vehicles, only they have a full set of sensors. Motor vehicle 1 (first motor vehicle) is not fully equipped with sensors within the scope of the present invention. It therefore has to rely on obtaining corresponding characteristics from the outside.

For this purpose, the corresponding characteristics are ascertained in second motor vehicles 2 and 3 and transmitted via radio links 22 and 23 to a transmitter 20. Radio links 22 and 23 may be developed as unidirectional radio links or as bidirectional links. Transmitter 20 is set up to transmit corresponding characteristics via a radio link 42, that is preferably developed in a bidirectional manner, to a diagnostic and service station 40. Diagnostic and service station 40 may be set up to reprocess the characteristics received, e.g. evaluate them statistically or apply the characteristics relevant to the operations received to suitable models. Via a radio link 43, diagnostic station 40 may also be in connection with a satellite radio system, illustrated by a satellite 30.

Even though in FIG. 1 a partially terrestrial (mobile radio) system is shown, which includes a terrestrial transmitter 20, it should be understood that the method is also able to operate completely using satellite technology.

Motor vehicle 1, that is not fully equipped, obtains from diagnostic station 40 via radio link 42 and transmitter 20 (or another transmitter situated in the spatial vicinity) and radio link 21 those characteristics which it is not able to generate from appropriate (its own) sensors.

As illustrated using dot-dashed arrows 31 and 32, at least motor vehicle 1 and motor vehicle 2 may also obtain position data via a satellite location system. The corresponding is also possible via terrestrial location systems. Because of that, the position data may be taken into account in the ascertainment of the characteristics. This is illustrated below by the example of a fuel quality as a characteristic.

In the example shown, let motor vehicle 2 be equipped with a fuel quality sensor, which may be set up, for example, to measure a density, a calorific value, a cetane number and/or an octane number, a sulfur content and/or a viscosity of a refueled fuel and/or a fuel during a filling-up process. At the same time, motor vehicle 2 is set up to ascertain a position from position data 32. The fuel quality of the fuel in the tank of motor vehicle 2 results from a preceding filling-up process at a gas station 50. Thus, motor vehicle 2 "knows" that the fuel at gas station 50 has a certain fuel quality ascertained using the fuel quality sensor. Motor vehicle 2 is able to transmit this information via radio link 22, transmitter 20 and radio link 42 to diagnostic station 40. Now if a motor vehicle not equipped with a corresponding fuel quality sensor, such as motor vehicle 1, fills up at gas station 50, which may be established by corresponding position data 31, one may assume that the fuel in the tank of motor vehicle 1 also has a corresponding fuel quality. This is able to be communicated to motor vehicle 1 by diagnostic station 40 via radio link 42 and 21 or rather transmitter 20, so that the engine of motor vehicle 1 may be actuated in a manner adapted to this fuel quality.

Figure 2:
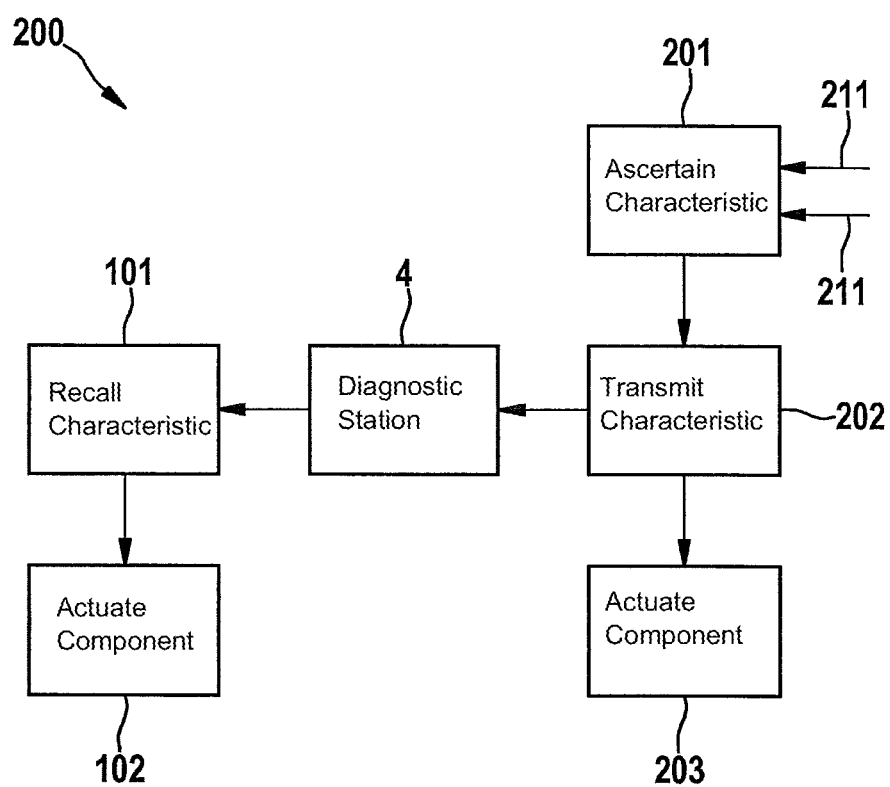
FIG. 2 shows a method according to one particularly preferred specific embodiment of the present invention, in a schematic representation.

FIG. 2 shows a method according to a particularly preferred specific embodiment of the present invention, in the form of a flow chart shown schematically and designated overall by 200. In the method, steps running in a first motor vehicle 1 are designated by 101 and 102, and steps running in a second motor vehicle 2 by 201 through 203.

In a step 201, the second motor vehicle, on the basis of sensor values 211, ascertains at least one characteristic which is relevant to the second motor vehicle. In a step 202, this at least one characteristic is transmitted to a diagnostic station 40 (cf. FIG. 1). From diagnostic station 40, the at least one characteristic gets to first motor vehicle 1, where it is recalled in a step 101. The further method steps run essentially identically in the two motor vehicles. In steps 102 and 203, the component explained is in each case actuated using the corresponding characteristics.

What is claimed is:

1. A method for operating a first motor vehicle, comprising:
   ascertaining at least one characteristic relevant to an operation of the first motor vehicle; and
   actuating at least one component of the first motor vehicle on the basis of the at least one characteristic,
   wherein the at least one characteristic is ascertained in at least one second motor vehicle,
   wherein the first motor vehicle has fewer sensors than then second motor vehicle, wherein the at least one characteristic is ascertained by evaluating at least one sensor value of the sensors,
   wherein the at least one characteristic is transmitted by the at least one second motor vehicle to at least one diagnostic station and by the at least one diagnostic station to the first motor vehicle.

2. The method as recited in claim 1, wherein the at least one characteristic is ascertained in at least two second motor vehicles.

3. The method as recited in claim 1, wherein the at least one sensor value includes a sensor value of at least one of a combustion chamber pressure sensor, a lambda probe, a fuel pressure sensor, a fuel quality sensor, an air mass sensor, an intake-air temperature sensor, an intake-air pressure sensor, a nitrogen oxide sensor, and a particle sensor.

4. The method as recited in claim 1, wherein the at least one characteristic is ascertained in the at least one second motor vehicle on the basis of at least one of a control intervention value and an actuating variable of the at least one component.

5. The method as recited in claim 1, wherein the transmission takes place respectively by at least one of terrestrial mobile radio and satellite transmission.

6. The method as recited in claim 1, wherein the at least one characteristic is further ascertained while using a position signal.

7. The method as recited in claim 1, further comprising:
   ascertaining a fuel quality resulting from a preceding filling-up process as the at least one characteristic in the at least one second motor vehicle;
   ascertaining a location of a receiving filling-up process from a position signal at the point in time of the preceding filling-up process; and
   as the at least one component of the first motor vehicle, actuating an engine of the first motor vehicle on the basis of the fuel quality if the first motor vehicle has filled up at a location of the preceding filling-up process.

8. A system for carrying out a method for operating a first motor vehicle, the method including ascertaining at least one characteristic relevant to an operation of the first motor vehicle, and actuating at least one component of the first motor vehicle on the basis of the at least one characteristic, wherein the at least one characteristic is ascertained in at least one second motor vehicle, the system comprising:
   the first motor vehicle; and
   the at least one second motor vehicle; and
   an arrangement for transmitting the characteristic ascertained in the at least one second motor vehicle to the first motor vehicle,
   wherein the first motor vehicle has fewer sensors than then second motor vehicle, wherein the at least one characteristic is ascertained by evaluating at least one sensor value of the sensors,
   wherein the at least one characteristic is transmitted by the at least one second motor vehicle to at least one diagnostic station and by the at least one diagnostic station to the first motor vehicle.

9. A processing unit set up to carry out a method for operating a first motor vehicle, the method comprising:
   ascertaining at least one characteristic relevant to an operation of the first motor vehicle; and
   actuating at least one component of the first motor vehicle on the basis of the at least one characteristic, wherein the at least one characteristic is ascertained in at least one second motor vehicle,
   wherein the processing unit includes at least one diagnostic station of a system,
   wherein the first motor vehicle has fewer sensors than then second motor vehicle, wherein the at least one characteristic is ascertained by evaluating at least one sensor value of the sensors, wherein the at least one characteristic is transmitted by the at least one second motor vehicle to the at least one diagnostic station and by the at least one diagnostic station to the first motor vehicle.

10. A computer program having program code that causes a processing unit to carry out a method for operating a first motor vehicle, the method comprising:

ascertaining at least one characteristic relevant to an operation of the first motor vehicle; and actuating at least one component of the first motor vehicle on the basis of the at least one characteristic, wherein the at least one characteristic is ascertained in at least one second motor vehicle, wherein the first motor vehicle has fewer sensors than then second motor vehicle, wherein the at least one characteristic is ascertained by evaluating at least one sensor value of the sensors, wherein the at least one characteristic is transmitted by the at least one second motor vehicle to at least one diagnostic station and by the at least one diagnostic station to the first motor vehicle.

11. A machine-readable storage medium, comprising:

a computer program having program code that causes a processing unit to carry out a method for operating a first motor vehicle, the method comprising:

ascertaining at least one characteristic relevant to an operation of the first motor vehicle, and actuating at least one component of the first motor vehicle on the basis of the at least one characteristic, wherein the at least one characteristic is ascertained in at least one second motor vehicle, wherein the first motor vehicle has fewer sensors than then second motor vehicle, wherein the at least one characteristic is ascertained by evaluating at least one sensor value of the sensors, wherein the at least one characteristic is transmitted by the at least one second motor vehicle to at least one diagnostic station and by the at least one diagnostic station to the first motor vehicle.

* * * * *